US012264788B1

(12) United States Patent
Chen

(10) Patent No.: US 12,264,788 B1
(45) Date of Patent: Apr. 1, 2025

(54) SOLDER-FREE LED BULB

(71) Applicant: Siming Chen, Dali (CN)

(72) Inventor: Siming Chen, Dali (CN)

( * ) Notice: Subject to any disclaimer, the term of this patent is extended or adjusted under 35 U.S.C. 154(b) by 0 days.

(21) Appl. No.: 18/796,359

(22) Filed: Aug. 7, 2024

(51) Int. Cl.
*F21Y 115/10* (2016.01)
*F21K 9/238* (2016.01)

(52) U.S. Cl.
CPC ........... *F21K 9/238* (2016.08); *F21Y 2115/10* (2016.08)

(58) Field of Classification Search
CPC ............................. F21K 9/238; F21Y 2115/10
See application file for complete search history.

(56) References Cited

U.S. PATENT DOCUMENTS 7,892,031 B1 * 2/2011 Mostoller ............. F21V 23/006 313/317
9,310,061 B2 * 4/2016 Mostoller ............. F21V 23/005
2012/0314422 A1 * 12/2012 Dong .................... F21V 23/006 362/373
2015/0070910 A1 * 3/2015 Yang ......................... F21K 9/23 362/396
2016/0131310 A1 * 5/2016 Lu ........................... F21V 23/06 362/382
2020/0332963 A1 * 10/2020 Wu ......................... F21V 23/02

* cited by examiner

*Primary Examiner* — Evan P Dzierzynski
(74) *Attorney, Agent, or Firm* — Jose Cherson Weissbrot

(57) ABSTRACT

A solder-free LED bulb comprises a bulb shell, a conductive base and a light-emitting member, wherein the light-emitting member is arranged in the bulb shell; the bulb shell has at least one open end, the inner side of the open end is set as a mounting area, and a mounting base is arranged in the mounting area; wherein, the mounting base comprises a mounting part, a slot is arranged on the mounting part, and a conductive member is hooked on the slot; the light-emitting member comprises a circuit board with one end plugged into the slot, and at least one side of the circuit board is printed with a circuit.

12 Claims, 8 Drawing Sheets

SOLDER-FREE LED BULB

TECHNICAL FIELD

The present invention relates to the technical field of light bulbs, in particular to a solder-free LED light bulb.

BACKGROUND

LED light bulb, called LED light bulb, is a kind of lighting equipment that uses LED as light source. LED is a kind of semiconductor material which can convert electric energy into light energy. It has the characteristics of high efficiency, energy saving, environmental protection, long service life, small size, light weight, fast response, impact resistance, vibration resistance, high light quality and easy dimming and color matching. Because of these advantages, LED bulbs have been widely used in many fields, such as home lighting, commercial lighting, industrial lighting, landscape lighting, automobile lighting and so on, and become the mainstream development direction of modern lighting technology.

The existing U.S. Pat. No. 11,408,585 discloses a "Waterproof and shatterproof light string", and the light bulb in this patent has good waterproof performance. However, when the light-emitting member and the conductive member in this patent are assembled, the light-emitting member and the conductive member have to be soldered. However, the connection by soldering will reduce the production and processing efficiency of products and increase the processing and manufacturing costs.

Therefore, there is a need to propose a new type of LED bulb. When assembling, the light-emitting member and the conductive member can be connected without welding, and the assembly is convenient and fast, which can effectively improve the production and processing efficiency of products and reduce the processing and manufacturing costs.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The present invention provides a solder-free LED bulb to solve that problem that the light-emitting member and conductive member need to be soldered for the existing LED bulb, which reduces the production and processing efficiency of product and increases the processing and manufacturing cost.

In order to achieve the above object, the present invention adopts the following technical solutions:

the present invention provides a solder-free LED bulb, which includes a bulb shell, a conductive base and a light-emitting member, wherein the light-emitting member is arranged in the bulb shell, wherein, the bulb shell has at least one open end, an inner side of the open end is set as a mounting area, and a mounting base is arranged in the mounting area; and wherein, the mounting base includes a mounting part, a slot is formed on the mounting part, and a conductive member is hooked on the slot;

the light-emitting member includes a circuit board with one end plugged into the slot, and at least one side of the circuit board is printed with a circuit; and wherein, when one end of the circuit board is inserted into the slot, the circuit and the conductive member are electrically connected without welding.

The present invention further provides a solder-free LED bulb, which includes a bulb shell, a conductive base and a light-emitting member, wherein the light-emitting member is arranged in the bulb shell, wherein, the bulb shell has at least one open end, an inner side of the open end is set as a mounting area, and a mounting base is arranged in the mounting area; and wherein, the mounting base is provided with a slot, and a conductive member is hooked on the slot, and wherein, one end of the light-emitting member is inserted into the slot and electrically connected with the conductive member in a solder-free manner.

The present invention further provides a solder-free LED bulb, which includes a bulb shell, a conductive base and a light-emitting member, wherein the light-emitting member is arranged in the bulb shell, wherein, the bulb shell has at least one open end, an inner side of the open end is set as a mounting area, and a mounting base is arranged in the mounting area; and wherein, the mounting base is provided with a solder-free connection structure, and a conductive member is arranged in the solder-free connection structure; and wherein, the light-emitting member is electrically connected with the conductive member in a solder-free manner through the solder-free connection structure.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

Figure 1:
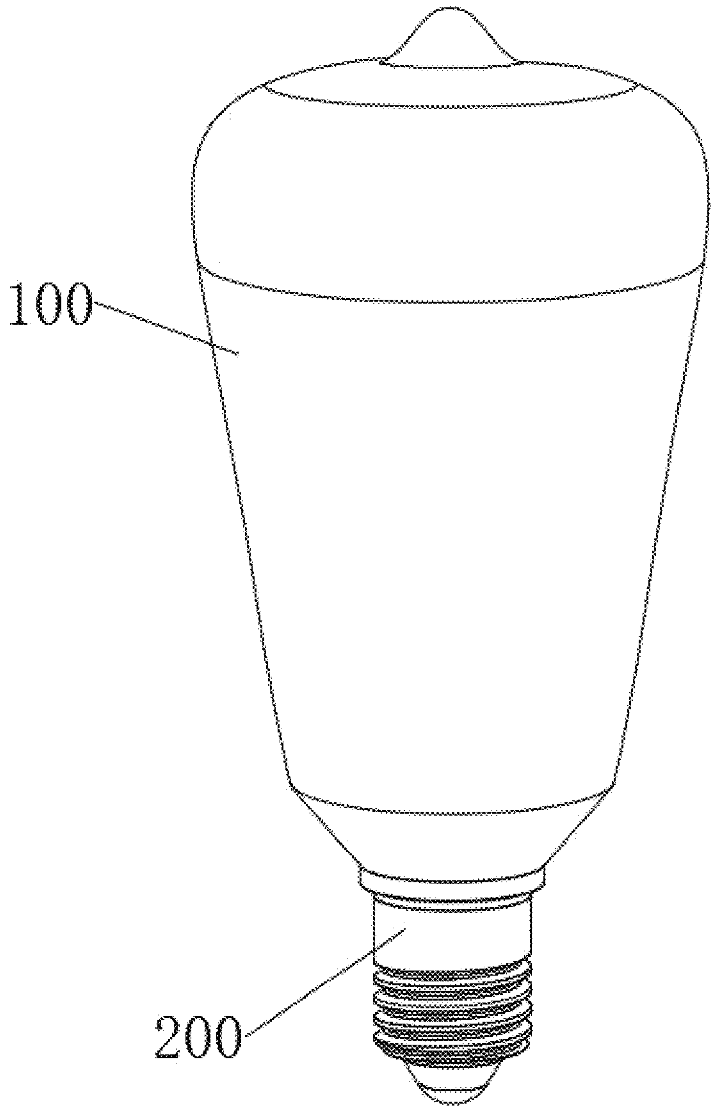
FIG. 1 is a perspective view of the whole invention.
Figure 2:
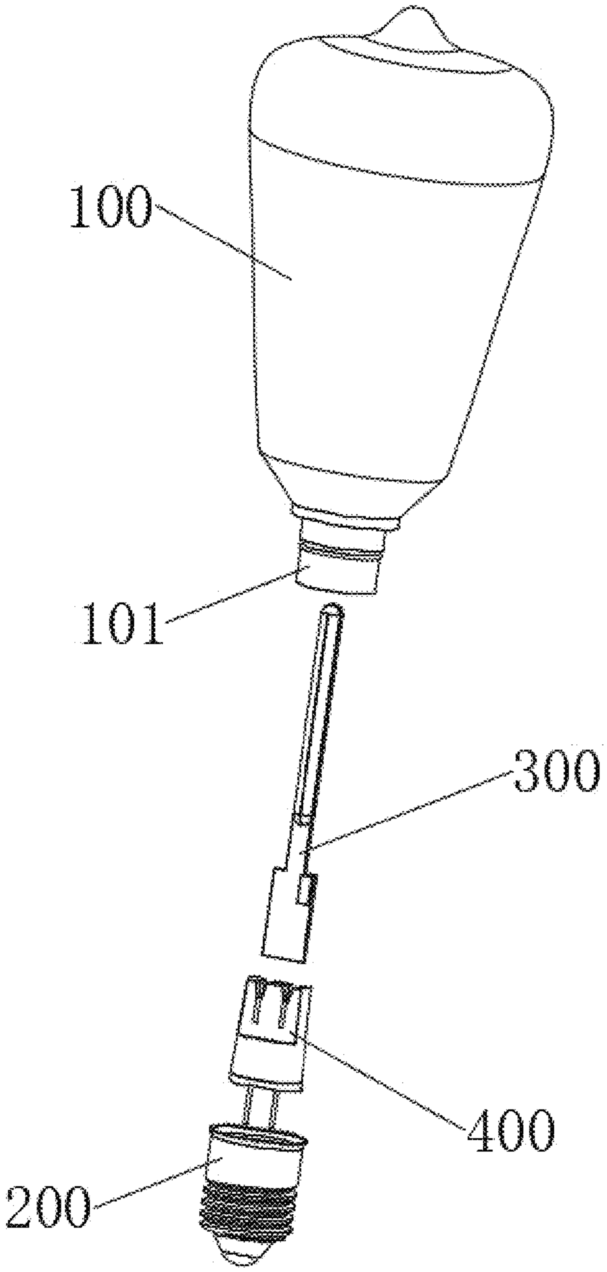
FIG. 2 is an explosion schematic diagram of the whole invention.

Reference signs: Bulb shell (100); Open end (101); Mounting area (102); Conductive base (200); Light-emitting member (300); Circuit board (301); Plug-in part (3011); Extension part (3012); Lamp bead (302); Circuit (303); Connecting end (3031); Sealant (304); Mounting base (400); Fitting part (401); Mounting part (402); Slot (403); Positioning groove (404); Sealing groove (405); Sealant (406); Conductive member (500); External part (501); Folded-back part (502); Built-in part (503); Protrusion (504).

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

Please refer to FIG. 1 to FIG. 8.

The present invention provides a solder-free LED bulb, which includes a bulb shell 100, a conductive base 200 and a light-emitting member 300, wherein the light-emitting member 300 is arranged in the bulb shell 100; The bulb shell 100 has at least one open end 101, and the inside of the open end 101 is set as a mounting area 102, and the mounting base 400 is set in the mounting area 102; the mounting base 400 includes a mounting part 402, a slot 403 is formed in the mounting part 402, and a conductive member 500 is hooked in the slot 403; one end of the light-emitting member 300 is inserted into the slot 403 and electrically connected with the conductive member 500 in a solder-free manner.

In this embodiment, the bulb shell 100 is made of colorless and transparent plastic with high light transmittance, which aims to ensure that the light can penetrate the bulb shell 100 with the minimum attenuation rate when the light-emitting member 300 is energized to emit light, so as to realize efficient and uniform light propagation, thereby improving the lighting effect.

In other embodiments (not shown), the bulb shell 100 is not only made of colorless and transparent plastic, but also can be made of various advanced materials such as special glass and high-performance optical grade acrylic. These materials not only have the excellent characteristics of traditional materials, such as excellent light transmittance, heat resistance and corrosion resistance, but also significantly improve the mechanical strength, aging resistance and processability. And the color is not only colorless, but also colored. Color not only covers a wide range of color gamut, but also fully considers the influence of color on people's psychology and physiology, thus creating a more comfortable, harmonious and layered lighting environment. Moreover, the shape of the bulb shell 100 is not limited to the conical shape in the figure, but also can be any other three-dimensional geometric shape such as a sphere, a rectangle, a five-pointed star, etc. Some unique shapes can be designed, so that the propagation path and distribution mode of light in the bulb shell 100 can be optimized, and the lighting effect and energy-saving performance can be further improved.

In this embodiment, the inside of the conductive base 200 is hollow and sleeved outside the open end 101, and the outside of the conductive base 200 is provided with threads, so that the conductive base 200 can be stably and conveniently installed inside the lamp through the external threads, and the mounting accuracy and efficiency are improved. Moreover, the conductive base 200 in this embodiment inherits the classical layout of the existing bulb base in terms of electrical connection, that is, it integrates the positive and negative connection points. This method not only ensures the compatibility with the existing lighting system, but also ensures the reliability and safety of current transmission.

Figure 3:
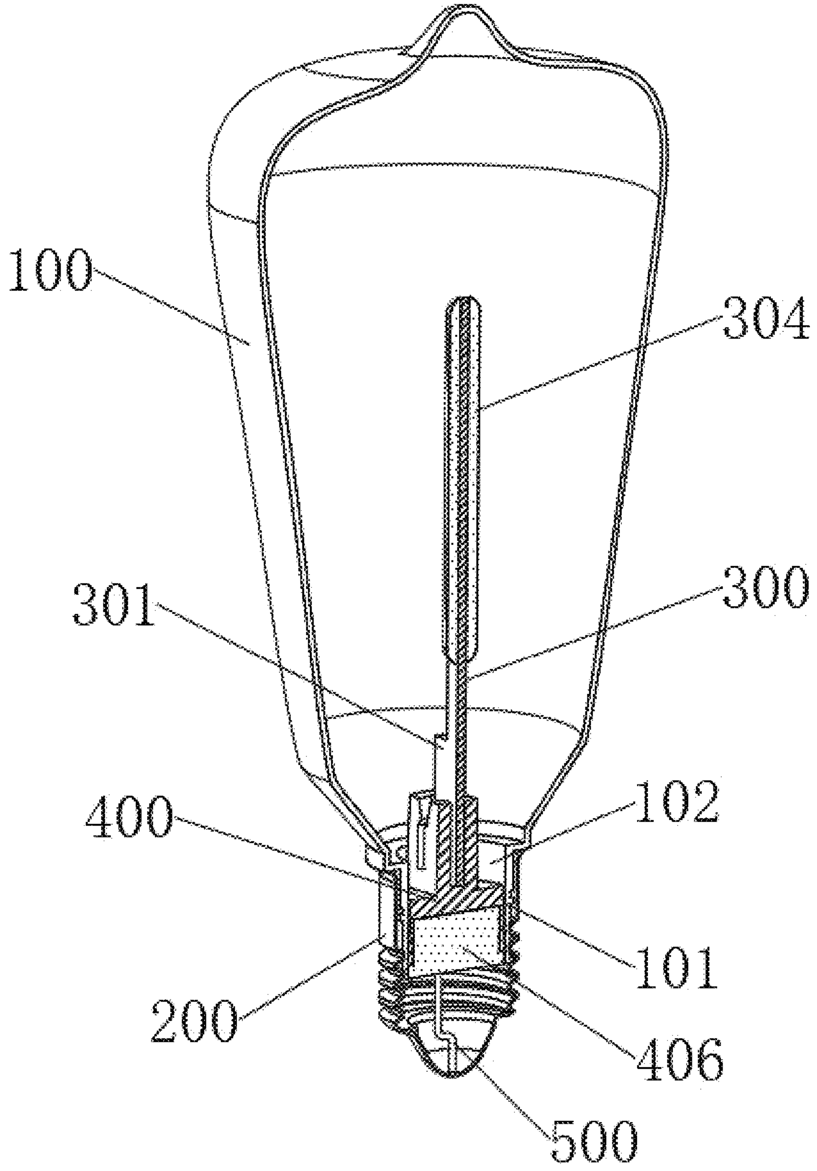
FIG. 3 is a sectional view of the whole invention.
Figure 4:
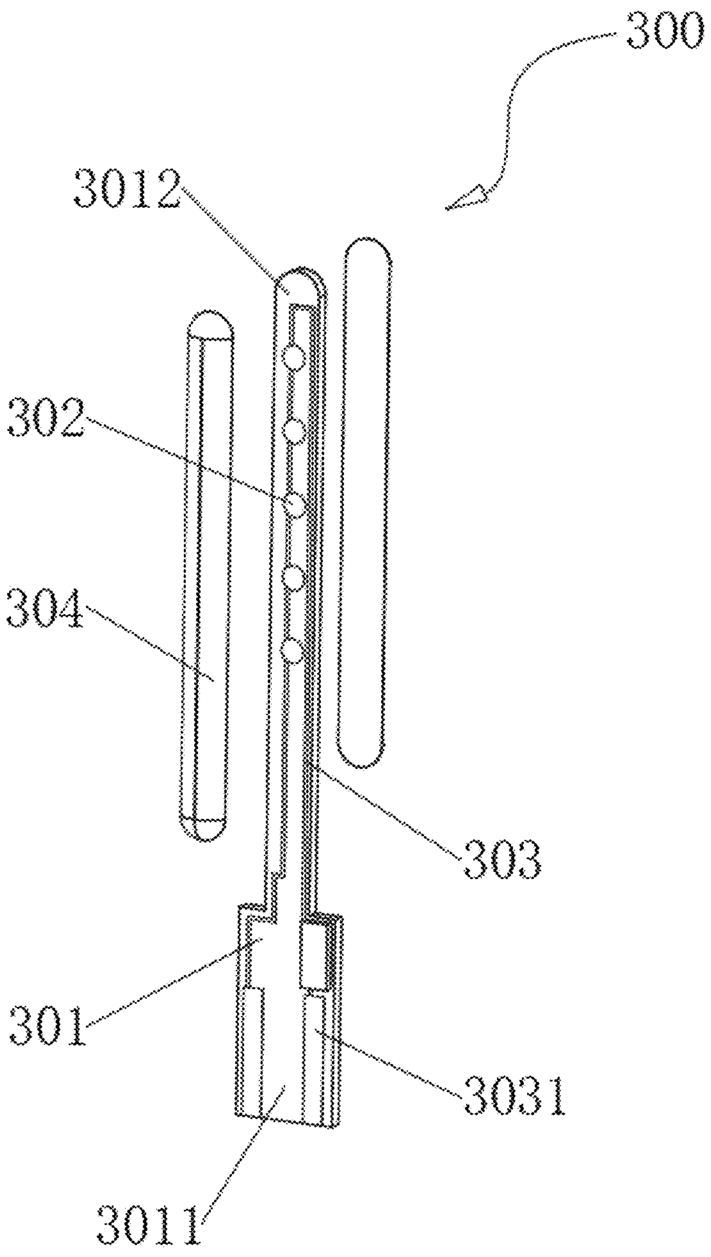
FIG. 4 is a schematic structural diagram of the light-emitting member of the present invention.
Figure 5:
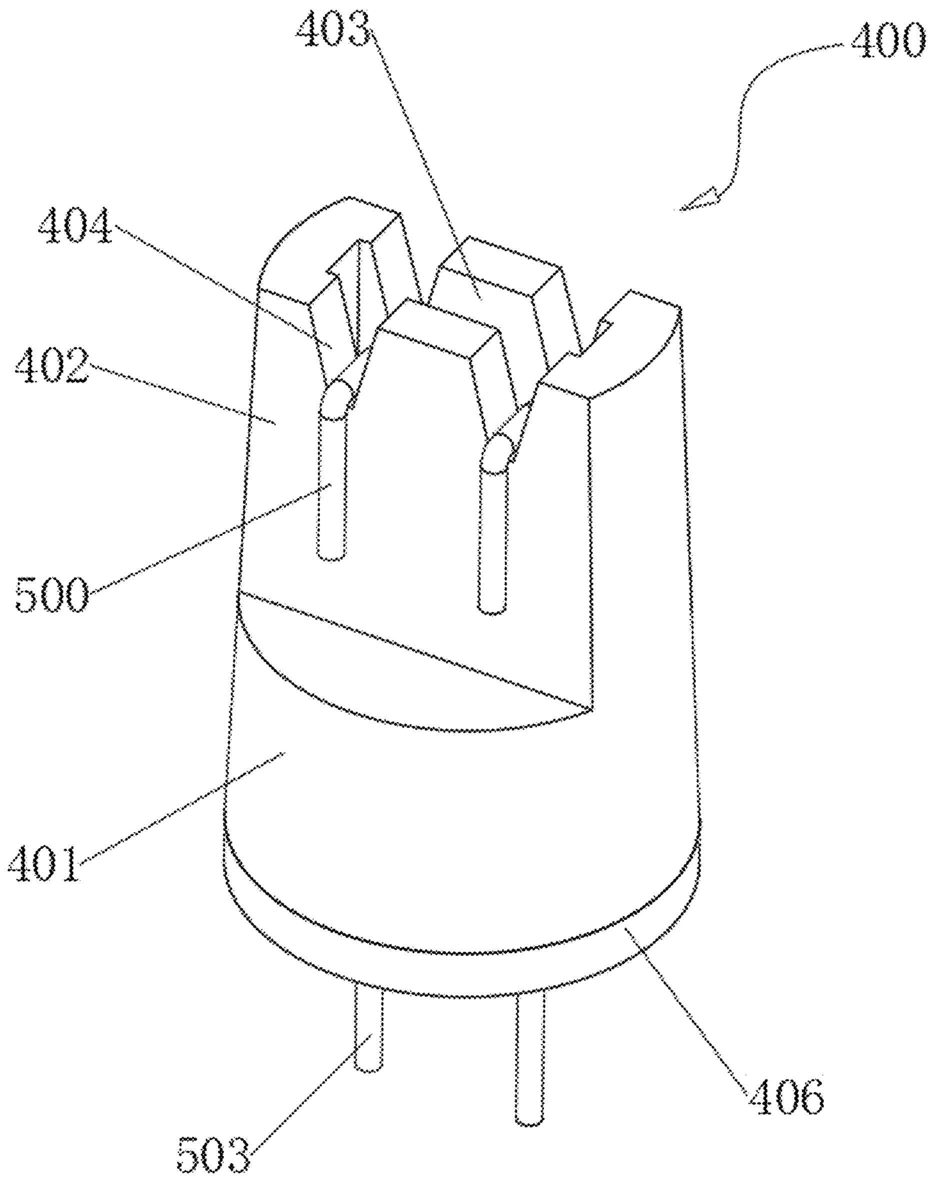
FIG. 5 is a schematic structural view of the mounting base of the present invention.

As shown in FIG. 3, one end of the conductive member 500 penetrates through the mounting base 400 and extends into the conductive base 200, and the conductive member 500 is electrically connected with the conductive base 200. Therefore, when the LED bulb is installed in the lamp, the power can be transmitted to the conductive member 500 through the conductive base 200, and the conductive member 500 transmits the power to the light-emitting member 300, and then the light-emitting member 300 is electrified to emit light.

In the preferred embodiment of this example, the light-emitting member 300 includes a circuit board 301 with one end plugged into a slot 403, and at least one side of the circuit board 301 is printed with a circuit 303. One end of the circuit board 301 connected with the slot 403 is set as a plug-in part 3011, and the other end of the circuit board 301 extends away from the mounting base 400 and is set as an extension part 3012. The circuit 303 is printed on the plug-in part 3011 and the extension part 3012. The circuit 303 includes at least two connecting ends 3031, and the two connecting ends 3031 are located in the plug-in part 3011 and separated from each other. The light-emitting member 300 further includes a lamp bead 302 mounted on an extension part 3012, and the lamp bead 302 is electrically connected with a circuit 303, and a cured encapsulant 304 is coated between the lamp bead 302 and the extension part 3012. There are at least two conductive members 500, and the two conductive members 500 are arranged corresponding to the two connecting ends 3031. The notch of the slot 403 is provided with at least two positioning grooves 404, and the two positioning grooves 404 are arranged corresponding to the two connecting ends 3031.

According to the above-mentioned preferred embodiment, the circuit 303 is made of copper foil and printed on the circuit board 301. When the circuit board 301 is inserted into the slot 403, the two connecting ends 3031 of the circuit 303 will just be in close contact with the two conductive members 500, so that the conductive members 500 and the light-emitting members 300 can be connected in a solder-free manner, and the power can be transmitted between the conductive members 500 and the light-emitting members 300. In addition, through the solder-free way, problems such as thermal stress, material deformation and welding defects that may occur in the welding process are avoided. Therefore, in this way, the assembly process of LED bulbs is simplified and becomes faster and more efficient. Moreover, this way not only accelerates the running speed of the production line, but also greatly improves the production and processing efficiency of the products. At the same time, due to the reduction of complex processes such as welding, the processing and manufacturing costs are also reduced accordingly, creating more considerable economic benefits for enterprises.

Moreover, in this embodiment, the lamp beads 302 are mounted on the circuit board 301, and the circuit board 301 is made of high-toughness materials at the same time, so that the light-emitting member 300 has excellent mechanical strength, and the light-emitting member 300 is not easy to be bent, broken and damaged, and the service life of the light-emitting member 300 is prolonged.

In this embodiment, by hooking the conductive member 500 in the slot 403, the mounting of the conductive member 500 is more convenient and faster, and the assembly efficiency is improved.

Figure 6:
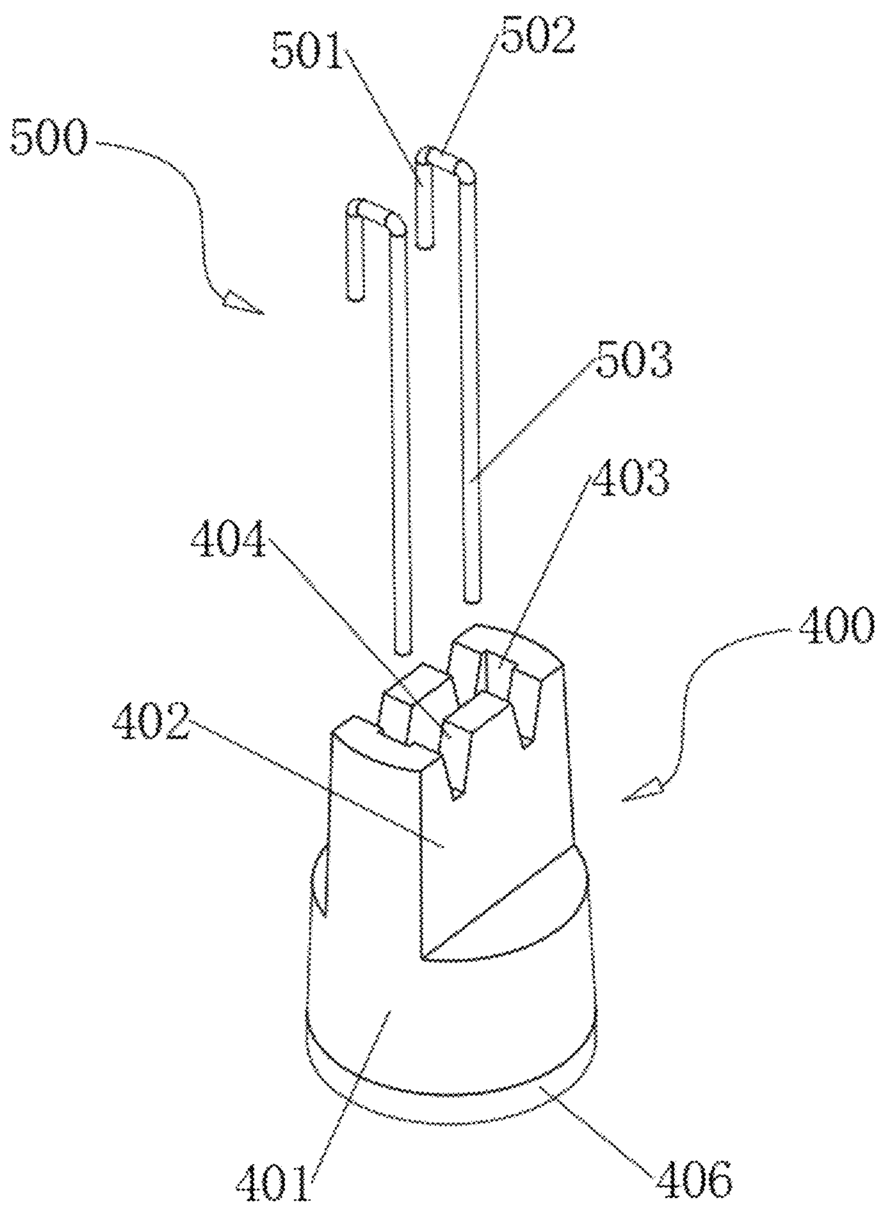
FIG. 6 is a first explosion schematic diagram of the mounting base of the present invention.
Figure 7:
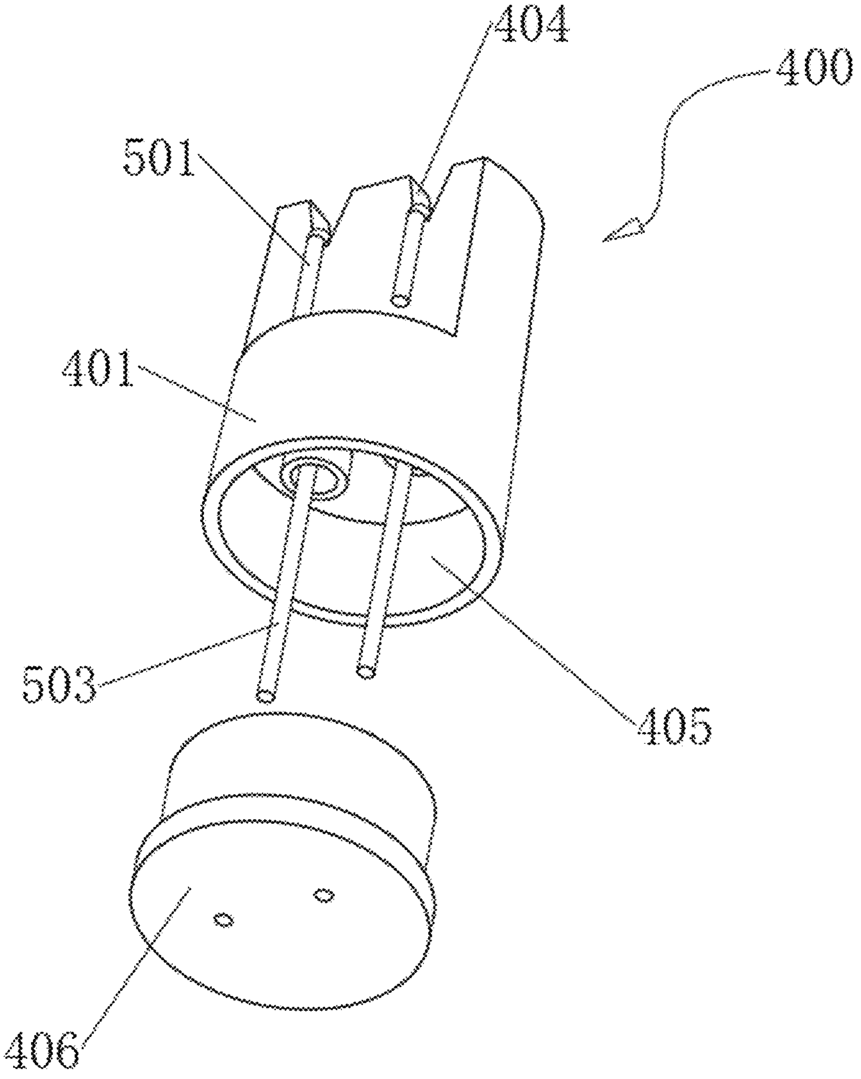
FIG. 7 is a second explosion schematic diagram of the mounting base of the present invention.

As shown in FIG. 6, the preferred embodiment of the conductive member 500 is that the conductive member 500 includes an external part 501, a folded-back part 502 and an built-in par 503, wherein the folded-back part 502 is connected between the external part 501 and the built-in par 503, and the folded-back part 502 is overlapped on the groove bottom of the positioning groove 404, and the external part 501 is attached to the external wall of the slot 403, while the built-in par 503 is located in the slot 403 and is tightly fit between that inner wall of the slot 403 and the connecting end 3031.

Through the above preferred embodiment, the conductive member 500 can be installed in the slot 403 conveniently and quickly, and the positioning groove 404 plays a positioning role. When the conductive member 500 is hooked on the slot 403, the conductive member 500 will not be displaced, ensuring that the built-in part 503 can be aligned with the connecting end 3031 of the circuit 303, thus improving the stability of the connection between the conductive member 500 and the circuit 303.

In addition, in the above preferred embodiment, the conductive member 500 is two metal wires, such as iron wire, copper wire, aluminum wire, etc. By designing the conductive member 500 into a filament shape, not only the processing and manufacturing cost of raw materials is greatly reduced, but also the processing flexibility and plasticity of the conductive member 500 are significantly improved, making it easier to deform and adjust according to actual needs.

Figure 8:
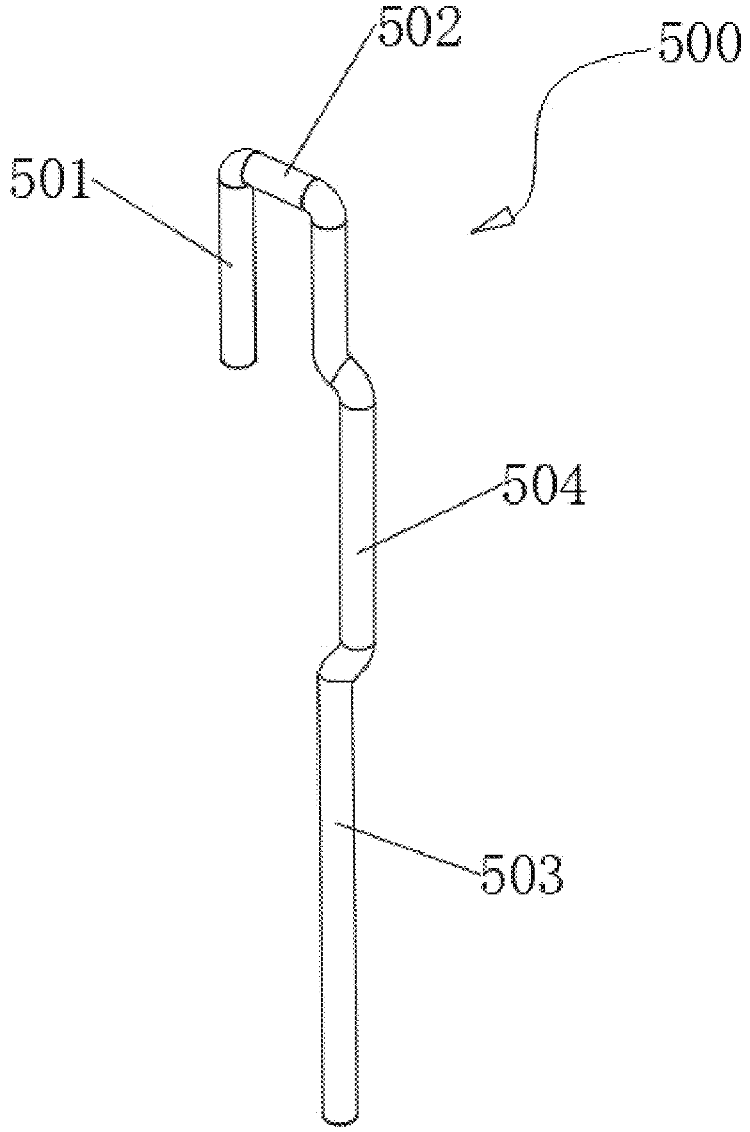
FIG. 8 is a schematic structural view of another embodiment of the conductive member of the present invention.

In another embodiment of the conductive member 500, as shown in FIG. 8, the built-in part 503 can also be provided with a protrusion 504 protruding toward the connecting end 3031, and the conductive member 500 is made of a conductive material with high toughness and elasticity, such as spring steel. Therefore, when the circuit board 301 is inserted into the slot 403, the protrusion 504 will be squeezed by the circuit board 301 and elastically deformed. Therefore, the protrusion 504 can exert a reaction force on the circuit board 301 by using its own resilience, so as to ensure that the conductive member 500 can be closely attached to the connecting end 3031 on the circuit board 301, and avoid the unstable circuit connection caused by looseness. Moreover, through the elastic protrusion 504 matching with the inner wall of the slot 403, the plug-in part 3011 of the circuit board 301 can be clamped in the slot 403, thus improving the plug-in stability of the circuit board 301 and the slot 403 and preventing the circuit board 301 from loosening and falling off.

In other embodiments of the conductive member 500 (not shown), the conductive member 500 can also be made of a sheet-like conductive material, and the sheet-like conductive member 500 is also in a bent hook shape, and the size of the positioning groove 404 is also corresponding to that of the sheet-like conductive member 500. By arranging the conductive member 500 in a sheet shape, not only the contact area between the conductive member 500 and the light-emitting member 300 can be increased, but also the physical connection strength between the conductive member 500 and the light-emitting member 300 can be enhanced, and at the same time, the conductive area is significantly increased, thereby improving the efficiency and conductivity of current transmission. This characteristic is especially suitable for high-power LED bulbs, so as to ensure that the LED bulbs can still run stably under high current load.

In this embodiment, as shown in FIGS. 4 to 7, two conductive members 500, two connecting ends 3031 and two positioning grooves 404 are preferably arranged on the same side. In this way, it is simpler and more convenient to connect and assemble the conductive member 500 and the light-emitting member 300.

Of course, the two conductive members 500, the two connecting ends 3031 and the two positioning grooves 404 are not limited to being arranged on the same side. In other embodiments (not shown), the two conductive members 500, the two connecting ends 3031 and the two positioning grooves 404 can be arranged on two different sides as required, so that this solder-free connection mode can be applied to light emitting members 300 of other shapes.

In the present invention, the size and shape of the extension part 3012 of the circuit board 301 can be adjusted according to actual needs. For example, in this embodiment, the extension part 3012 has a long strip shape, while in other possible embodiments (not shown in the figure), the extension part 3012 can also have other geometric shapes such as a cylinder, a ring shape or a five-pointed star shape. These light-emitting members 300 with different shapes can not only bring more colorful appearance to LED bulbs, but also adapt to more diversified application scenarios through their unique light-emitting characteristics. For example, the cylindrical light-emitting member can realize uniform illumination in a large area through its uniform light-emitting surface, which is especially suitable for industrial workshops, commercial exhibition halls and other places that need high brightness and no dead angle illumination; ring-shaped light-emitting members, by virtue of their ring-shaped light distribution characteristics, can create a soft and layered lighting effect, which is suitable for hotel lobbies, art galleries and other spaces that pursue atmosphere creation;

however, complex polygon (such as five-pointed star) light-emitting members may become a specific theme space for lighting through their unique shapes and light-emitting modes.

In this embodiment, as shown in FIGS. 2, 3 and 5 to 7, the mounting base 400 further includes a fitting part 401 integrally formed with the mounting part 402, and the outer wall of the fitting part 401 is in taper fit with the inner wall of the mounting area 102. The mounting base 400 is in taper fit with the taper of the inner wall of the mounting area 102 through the fitting part 401, so that the mounting base 400 can be inserted into the open end 101 and fixed. Moreover, due to the taper fit between the fitting part 401 and the inner wall of the mounting area 102, the mounting base 400 can be closely attached to the inner wall of the open end 101, thus ensuring a good waterproof and sealing effect between the mounting base 400 and the open end 101.

Further, the fitting part 401 is provided with a sealing groove 405, and the scaling groove 405 is arranged on the same side as the opening of the open end 101. The built-in parts 503 of the two conductive members 500 both pass through the slot 403 and the sealing groove 405 in turn and extend into the conductive base 200, and the two built-in parts 503 are respectively connected with the positive and negative poles of the conductive base 200, and a cured sealant 406 is filled between the sealing groove 405, the conductive member 500 and the mounting area 102.

When both the light-emitting member 300 and the mounting base 400 are installed in the bulb shell 100, the sealant 406 can be injected into the sealing groove 405. After the sealant 406 is cured, the sealant 406 can make waterproof sealing between the scaling groove 405, the conductive member 500 and the mounting area 102, thus further improving the waterproof sealing effect of the LED bulb, ensuring that external moisture can not penetrate into the bulb shell 100 even in a humid or rainy environment, and ensuring the long-term stability of the lamp. At the same time, after the sealant 406 is cured, the conductive member 500 can be firmly fixed on the mounting base 400, thus completely eliminating the risk of loosening caused by vibration, temperature change and other factors. This method strengthens the connection between the conductive member 500 and the light-emitting member 300, which not only improves the stability and reliability of the electrical connection, but also prolongs the service life of the LED bulb.

The technical means disclosed in the scheme of the present invention are not limited to the technical means disclosed in the above embodiments, but also include the technical scheme composed of any combination of the above technical features. It should be pointed out that for those skilled in the art, several improvements and embellishments can be made without departing from the principle of the present invention, and these improvements and embellishments are also regarded as the protection scope of the present invention.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A solder-free LED bulb, comprising a bulb shell, a conductive base and a light-emitting member, wherein the light-emitting member is arranged in the bulb shell, wherein the bulb shell has at least one open end, an inner side of the open end is set as a mounting area, and a mounting base is arranged in the mounting area;

wherein the mounting base comprises a mounting part, a slot is formed on the mounting part, and at least two conductive members are hooked on the slot;

wherein the light-emitting member comprises a circuit board with one end plugged into the slot, and at least one side of the circuit board is printed with a circuit;

wherein, when the one end of the circuit board is inserted into the slot, the circuit and the at least two conductive members are electrically connected without welding;

wherein the one end of the circuit board connected with the slot is set as a plug-in part, and other end of the circuit board extends in a direction away from the mounting base and is set as an extension part;

wherein the circuit is printed on the plug-in part and the extension part, and the circuit comprises at least two connecting ends, and both the connecting ends are located in the plug-in part and separated from each other; and wherein the at least two conductive members are arranged correspondingly to the two connecting ends; a notch of the slot is provided with at least two positioning grooves, and the at least two positioning grooves are arranged correspondingly to the two connecting ends.

2. The solder-free LED bulb according to claim 1, wherein the light-emitting member further comprises a lamp bead installed on the extension part, and the lamp bead is electrically connected with the circuit, and a cured encapsulant is coated between the lamp bead and the extension part.

3. The solder-free LED bulb according to claim 1, wherein the at least two conductive members comprises an external part, a folded-back part and a built-in part, and the folded-back part is connected between the external part and the built-in part.

4. The solder-free LED bulb according to claim 3, wherein the folded-back part is overlapped on a groove bottom of the positioning groove, the external part is attached to an outer wall of the slot, and the built-in part is located in the slot and closely attached between an inner wall of the slot and the connecting end.

5. The solder-free LED bulb according to claim 4, wherein the mounting base further comprises a fitting part integrally formed with the mounting part, and an outer wall of the fitting part is in taper fit with an inner wall of the mounting area: a sealing groove is formed on the fitting part, and the sealing groove is arranged at a same side as an opening of the open end.

6. The solder-free LED bulb according to claim 5, wherein the conductive base is hollow inside and sleeved outside the open end, and the outside of the conductive base is provided with threads.

7. The solder-free LED bulb according to claim 6, wherein the built-in parts of the at least two conductive members sequentially pass through the slot and the sealing groove and extend into the conductive base, and the built-in part is connected with an anode and a cathode of the conductive base.

8. The solder-free LED bulb according to claim 7, wherein a cured sealant is filled between the sealing groove, the conductive member and the mounting area.

9. A solder-free LED bulb, comprising a bulb shell, a conductive base and a light-emitting member, wherein the light-emitting member is arranged in the bulb shell, wherein the bulb shell has at least one open end, an inner side of the open end is set as a mounting area, and a mounting base is arranged in the mounting area;

wherein the mounting base is provided with a solder-free connection structure, and a conductive member is arranged in the solder-free connection structure;

wherein the mounting base comprises a fitting part and a mounting part, and the solder-free connection structure comprises a slot and a positioning groove, wherein the slot is provided on the mounting part and faces the inside of the bulb shell, and the positioning groove is provided at a notch of the slot; and wherein the light-emitting member is electrically connected with the conductive member in a solder-free manner through the solder-free connection structure.

10. The solder-free LED bulb according to claim 9, wherein the conductive member is at least hooked in the positioning groove, and at least one end of the conductive member is located in the slot.

11. The solder-free LED bulb according to claim 10, wherein the light-emitting member comprises a circuit board and a lamp bead, wherein a circuit is printed on the circuit board, and the lamp bead is installed on the circuit board and electrically connected with the circuit; and one end of the circuit board is inserted into the slot together with a part of the circuit.

12. The solder-free LED bulb according to claim 11, wherein the part of the circuit located in the slot at least comprises two separate connecting ends, and the two connecting ends are respectively closely attached to and electrically connected with two conductive members.

* * * * *